United States Patent

[11] 3,613,514

[72] Inventor Frederick C. Melchior
258 Riverside Drive, New York, N.Y. 10025

[21] Appl. No. 819,007
[22] Filed Apr. 24, 1969
[45] Patented Oct. 19, 1971

[54] FLUID PRESSURE SENSING INSTRUMENT
1 Claim, 2 Drawing Figs.

[52] U.S. Cl. ..... 92/48, 73/398 R, 92/13, 336/30
[51] Int. Cl. ..... G01l 9/10, F01b 19/02
[50] Field of Search ..... 73/398, 407, 410, 393, 398 R; 336/30; 92/49, 13, 48

[56] References Cited

UNITED STATES PATENTS

| | | | |
|---|---|---|---|
| Re.23,723 | 10/1953 | Allwein | 73/410 X |
| 1,406,201 | 2/1922 | MacMichael | 73/410 |
| 1,656,262 | 1/1928 | Batchelder | 73/410 |
| 2,417,097 | 3/1947 | Warshaw | 336/30 |
| 2,618,157 | 11/1952 | Keeling, Jr. | 73/398 X |
| 3,162,795 | 12/1964 | Cherniak | 73/398 X |
| 3,296,868 | 1/1967 | Koppel et al. | 73/398 X |
| 2,376,156 | 5/1945 | Kuehni | 336/30 X |

*Primary Examiner*—Louis R. Prince
*Assistant Examiner*—Daniel M. Yasich
*Attorney*—Sandoe, Hopgood & Calimafde

ABSTRACT: In a fluid pressure sensing instrument using a diaphragm as a pressure-responsive element, an auxiliary diaphragm is used not only to guide the motion produced by deflections of the diaphragm capsule along a straight line, but also as a spring member to modulate the linearity of the said motion, to adjust the amplitude of said motion to desired value, and to restrain motion from vibration, acceleration and gravitational forces in directions other than along a straight line.

PATENTED OCT 19 1971

3,613,514

INVENTOR.
FREDERICK C. MELCHIOR

BY

Sandoe, Hopgood & Calimafde
ATTORNEYS

FLUID PRESSURE SENSING INSTRUMENT

This invention relates to fluid pressure sensing instruments in which pressure-responsive elements, such as diaphragms, diaphragm capsules, bellows or the like respond to variations in fluid pressure, ambient or internal, acting thereon, and translate such pressure variations into motion due to deflection of the element. It is known that such motion is seldom, if ever, perfectly straight, or perfectly linear, as variations in materials inevitably cause differences in rates of deflection in different parts of the element and in different stages of its deflection. Needless to say, in most critical applications, when deflection occurs, straight line motion and good linearity are important requisites for translation of deflection values into accurate readouts and control of processes and the like.

Such pressure-sensing instruments include those in which variations of pressure may be applied to the pressure-responsive elements either internally or externally and from various sources such, for example, as variations in barometric pressures or variations in pressures resulting from expansion or contraction of gas due to variations or temperature.

It is, therefore, an object of this invention to provide guidance for such motion which will cause it to follow a straight line for improved accuracy in read-out or in the translation of values into useful functions.

Another object of this invention is to provide means for compensating for variations in the spring rates of the pressure-responsive elements in order to obtain optimum linearity and, thus, consistent accuracy in read-out or in the translation of values into useful functions.

Another object of the invention is to provide means to adjust the amplitude of motion of the pressure-responsive elements for a given pressure range by adjusting the spring rates thereof.

Another object of this invention is to restrain motion from vibration, acceleration and gravitational forces in any direction other than along the aforesaid straight line.

A preferred embodiment of the invention selected for purposes of illustration is shown in the accompanying drawings in which.

Figure 1:
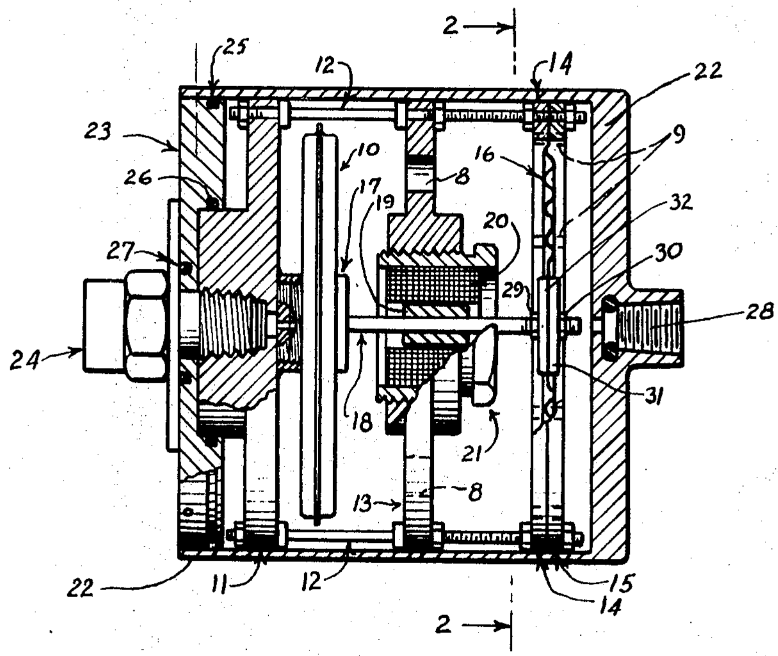
FIG. 1 is a longitudinal section through the instrument on the line 1—1 of FIG. 2.
Figure 2:
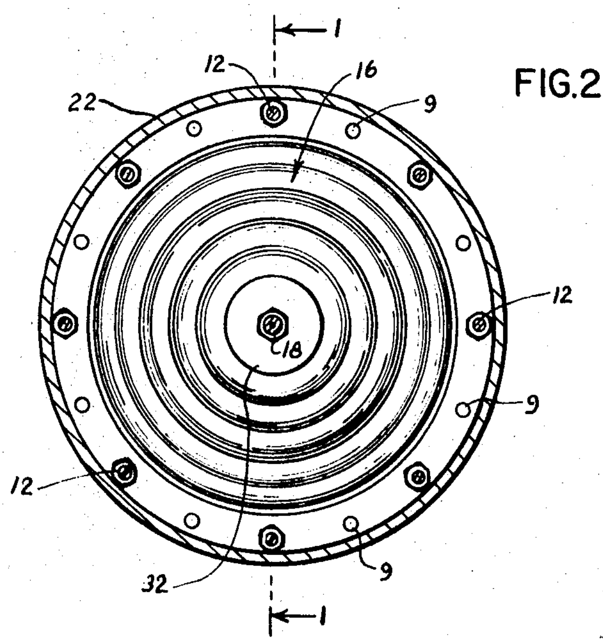
FIG. 2 is a section on the line 2—2 of FIG. 1.

Referring to FIG. 1, the pressure-responsive element comprises a diaphragm capsule 10 of a type disclosed in U.S. Pat. No. 2,760,260 comprising two diaphragms having their peripheral edges secured together and having the face of one diaphragm rigidly mounted in any suitable manner, such as by welding or soldering, onto a plate 11 having a hub which seats in a socket in the backplate 23. The face of the other diaphragm is free to move in response to variations in pressure applied to the capsule. Plate 11 is connected by a series of tie rods 12 to another plate 13. The said bolts or tie rods 12 pass through the plate 13 and are connected to clamping rings 14 and 15 which clamp and hold the periphery of a diaphragm 16 in fixed position between them. The said diaphragm is preferably similar to those used in the diaphragm capsule 10.

In the embodiment illustrated, motion of the diaphragm capsule 10 induced by variations in the pressures applied thereto is transmitted to an electrical sensor used to generate an electric current. For this purpose the moving face of capsule 10 is provided with a front hub 17 which is located at the center thereof and carries a rod 18 carrying a soft iron armature 19 which is surrounded by and movable within the coil 20 mounted in the sleeve 21 which is threaded into plate 13. The threaded end of armature rod 18 extends through the center of diaphragm 16 and through a pair of annular discs 31 and 32 which are welded to the diaphragm 16. A pair of locknuts 29 and 30 are mounted on the rod 18 and are tightened against the discs 31 and 32. The diaphragm 16, being directly connected to the moving face of the capsule 10, acts as an auxiliary spring to modulate the operation of the capsule, and means are provided for adjusting the force exerted by the diaphragm, acting as a spring, on the capsule. Thus, by loosening one of the nuts 29, 30 and tightening the other, it is possible to adjust the positions of the centers of the capsule 10 and the diaphragm 16 relative to one another to increase or decrease the distance therebetween. As both the capsule 10 and the diaphragm 16 have predetermined spring rates, the diaphragm 16 being normally softer, it is possible to preload the capsule 10 in either direction in order to compensate empirically for nonlinearity. Alternatively, such adjustment may be effected by loosening one of the nuts on the tie rods 12 and tightening the other to change the position of the discs 14, 15 on the tie rods 12.

The instrument structure is enclosed within a casing 22 which is secured to backplate 23 in any suitable manner, as by machine screws, not shown. The plate 11 is solidly secured to the backplate 23 by the threaded nipple 24 which provides a pressure connection to the interior of the diaphragm capsule 10. The entire assembly provides a rigid structure which, however, permits free motion of rod 18 as variations in pressure are applied to capsule 10, but only in a straight line.

Seals such as provided by O-rings 25, 26 and 27 provide hermetic sealing for the interior of the diaphragm capsule 10 and the passages leading thereto. The front of the case 22 has a pressure connection 28 which admits ambient pressure to the inside of case 22 and thereby to the outside of the capsule 10. The plate 13 has holes 8 and the clamping flanges 14 and 15 have holes 9 drilled therethrough so as to allow continuous equalization of pressure throughout the interior of the structure.

If the capsule 10 is used to measure differential pressures, receiving the higher pressure internally, the nipple 24 will provide a pressure connection communicating directly with the interior of the capsule 10. If the capsule 10 is an evacuated and sealed aneroid, the passage through the nipple 24 will be closed.

With variations in pressure applied to the capsule 10 either internally or externally, or both, the capsule will deflect, i.e. expand or contract, according to the magnitude and direction of the differential between the said pressures, thus moving the armature rod 18 and the soft iron slug 19 axially relative to the coil 20 thereby producing an electric current or signal commonly measured in volts. Such voltage may then be used for readout and/or control of processes in accordance with common accepted practice.

By properly selecting the spring rate of diaphragm 16, it is also possible to adjust the amplitude of the stroke of the capsule 10 to the exact desired value for a given pressure range. Moreover, suspension of the end of the armature rod in the center of the diaphragm assembly enforces straight line motion of the armature.

Finally, such suspension will also restrain motion from vibration, acceleration and gravitational forces in directions other than a straight line.

This invention may be variously modified and embodied within the scope of the subjoined claims.

What is claimed is:

1. A fluid pressure instrument comprising a pressure-responsive element mounted on a fixed support, said element comprising at least one diaphragm having a movable face which deflects in response to variations in pressure applied to said element, an auxiliary diaphragm having its periphery secured to a fixed support, both faces of said auxiliary diaphragm being spaced from, concentric with and parallel to the movable face of said first diaphragm, a rod connecting the center of the movable face of said first diaphragm to the center of said auxiliary diaphragm so that said auxiliary diaphragm is deflected by and with the deflection of the movable face of said first diaphragm, and thereby modulates the deflection of the movable face of said first diaphragm, and means for adjusting the position of the center of said auxiliary diaphragm with relation to the center of the movable face of said first diaphragm in either direction to apply positive or negative force to said first diaphragm to compensate for nonlinearity.